Feb. 4, 1941. J. LOUMIET ET LAVIGNE 2,230,254
METHOD FOR THE DISTILLATION OF LIQUIDS
Filed April 12, 1938 9 Sheets-Sheet 9
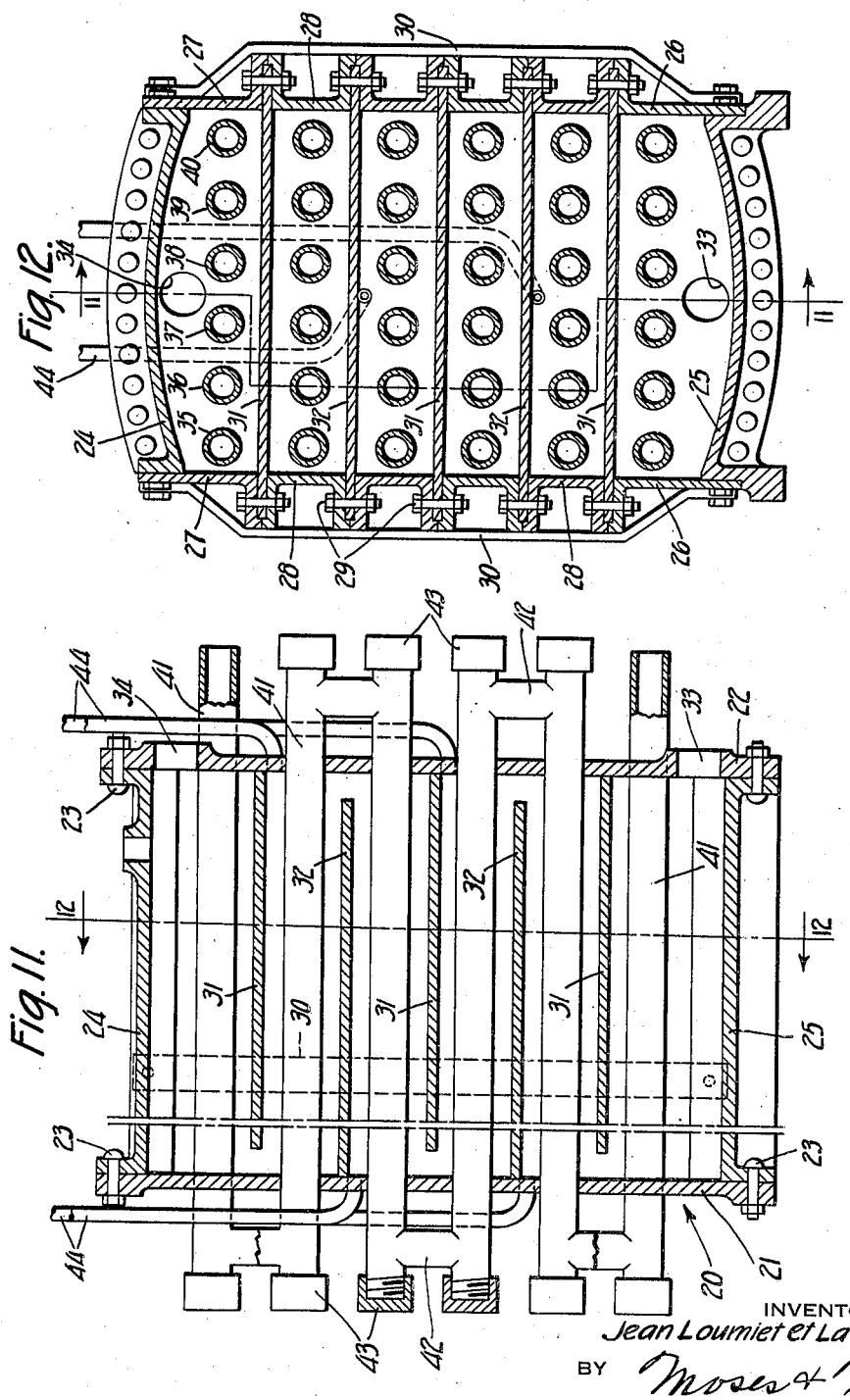
INVENTOR
Jean Loumiet et Lavigne
BY Moses & Nolte
ATTORNEYS Patented Feb. 4, 1941

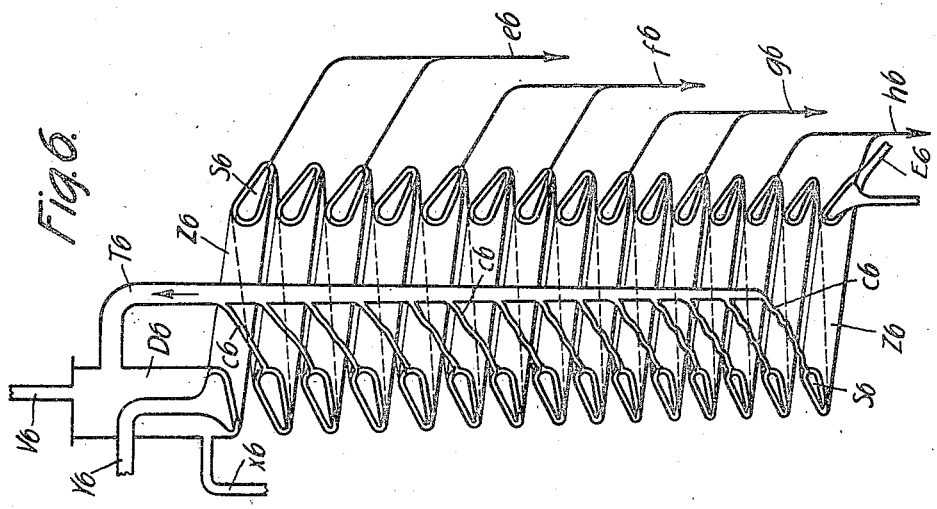
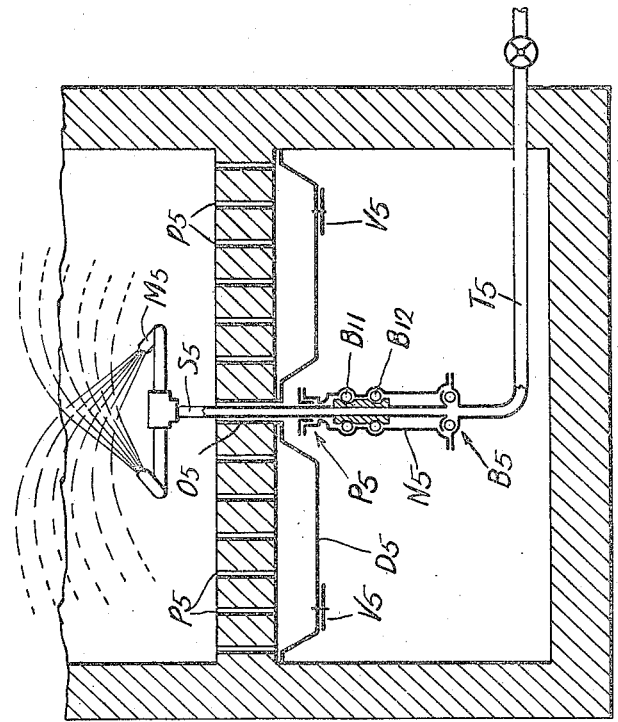

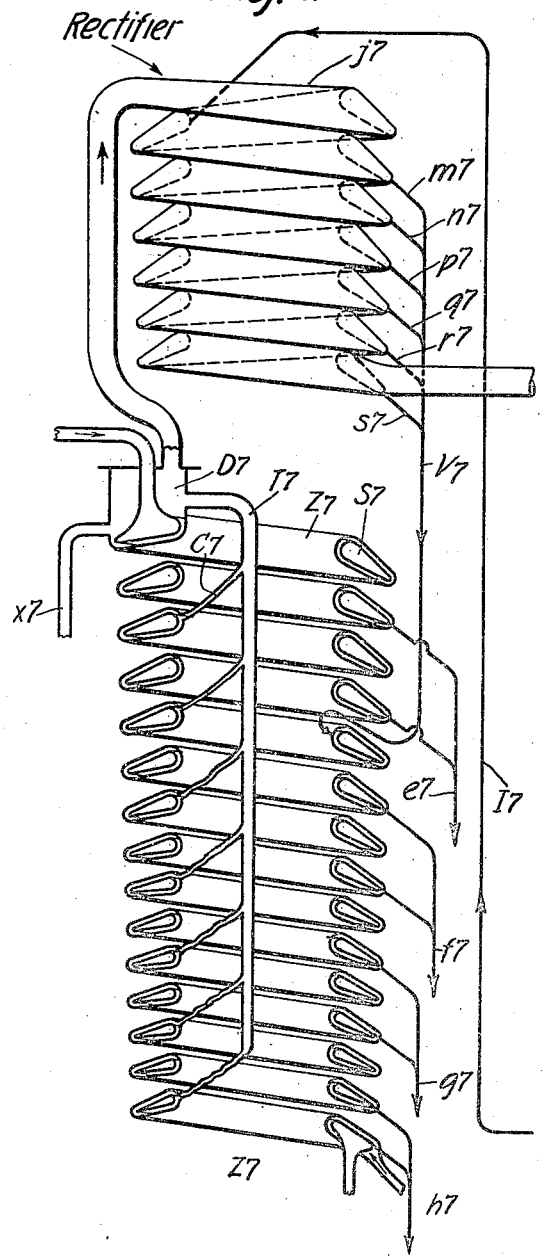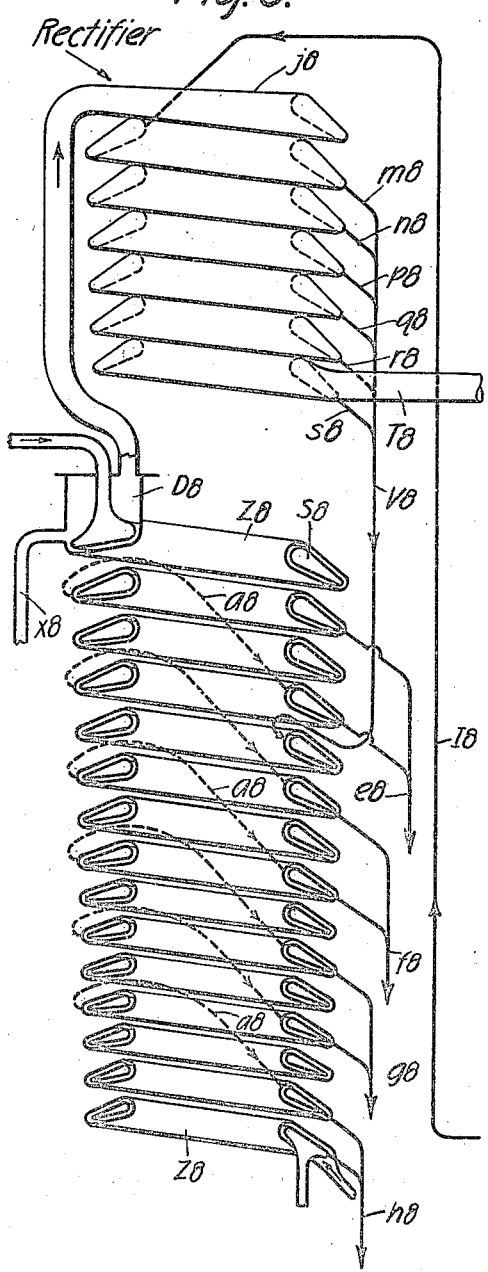

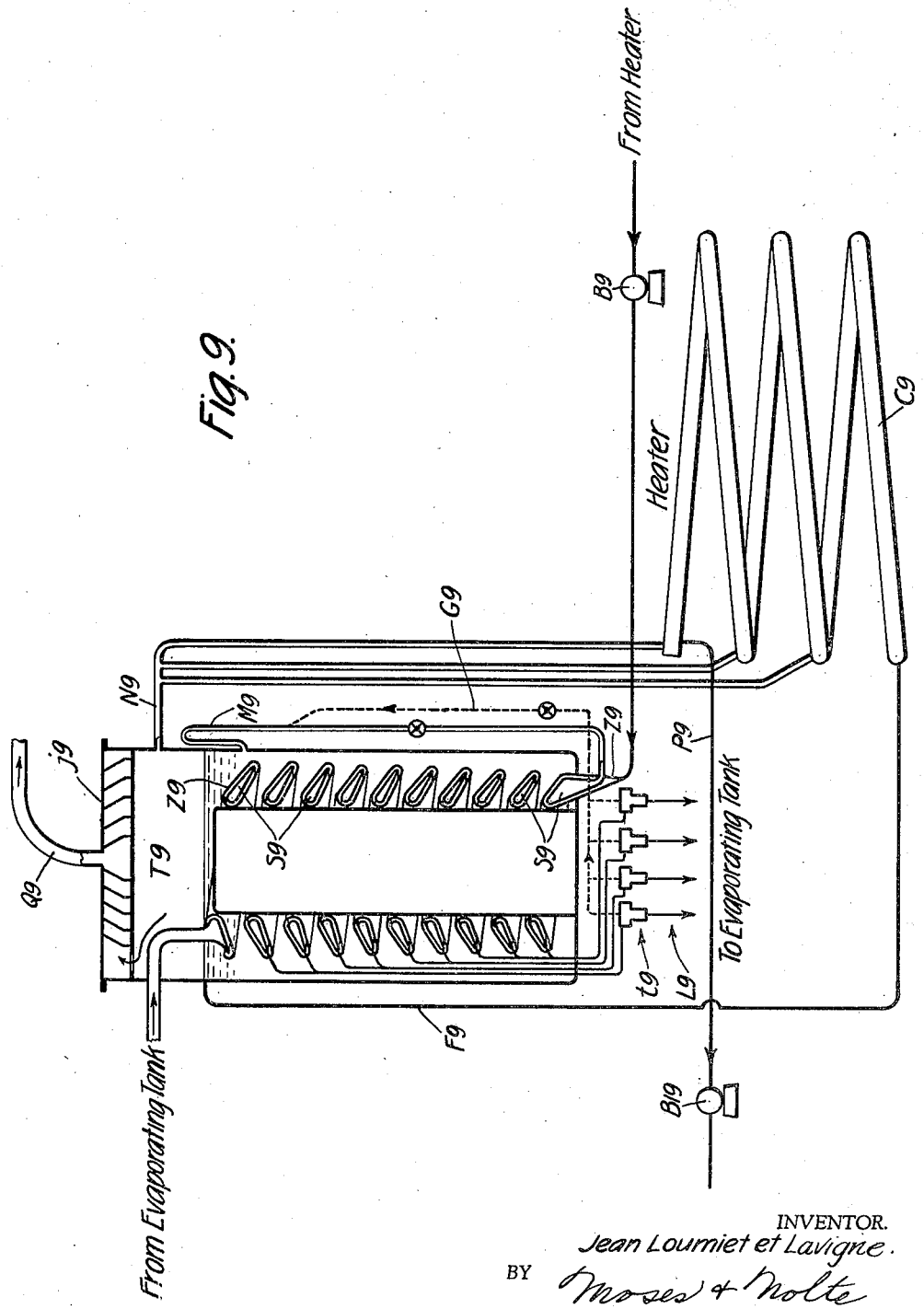

2,230,254

UNITED STATES PATENT OFFICE 2,230,254

METHOD FOR THE DISTILLATION OF LIQUIDS

Jean Loumiet et Lavigne, Itabo, Cuba

Application April 12, 1938, Serial No. 201,503
In Cuba April 20, 1937

3 Claims. (Cl. 196—71)

This invention relates to methods and means for effecting fractional distillation, involving a number of features which are useful either conjointly or separately in effecting fractional distillation. Certain features, however, have utility apart from distilling operations.

In certain aspects the present invention relates to improvements upon the invention disclosed in my pending application Serial No. 126,401 filed February 18, 1937, for Distillation of liquids, although here again certain features of the present invention are useful independently of the invention disclosed in my said prior application.

Since all of the features of the present invention do have utility in connection with the distillation of liquids as disclosed in my prior application, the present invention will be illustratively discussed and described with reference to its application to a system of that kind. It is to be understood, however, that such discussion and description are to be regarded as illustrative and not as definitive of the scope and utility of the novel features and combinations herein disclosed.

In my prior application, fractional distillation by multiple effects is carried out by causing the liquid to be distilled (say petroleum) to run through a series of tanks maintained at successively higher temperatures and pressures in which the hydrocarbons contained in the petroleum are evaporated fractionally.

The unevaporated liquid finally reaches the boiler or primary heater in which the last fraction is driven off. The liquid residue from the boiler which leaves the boiler at high temperature is returned through a series of heaters associated with the several tanks for transferring its heat at successively lower temperature stages to the liquid which is being heated and distilled. The vapors produced in each tank are passed through one or more condensing coils, located in the tank or tanks next lower in the temperature scale, and the condensates so produced are separately passed through the heaters associated with the tanks of the lower temperature stages. Thus the latent heat of vaporization is recovered at the condensation of the vapors and the heat contained in the liquid condensate and residue is recovered in the heaters.

All of the improvements of the present invention have utility in a system of the kind outlined above.

The first of these improvements consists in utilizing a part, at least, of the residue of the distilled petroleum as fuel for heating the boiler or boilers, and hence, for producing all of the heat utilized in the system.

The residue has very little market value because it is viscous when cooled, requires to be heated to a high temperature to render it fluid, and is poor in volatile constituents. It leaves the distillation boiler, however, at a high temperature and hence in a very fluid condition. It also leaves the boiler at a high pressure. These considerations make its immediate utilization as fuel a matter of great advantage and economy.

Any well known burner may be employed for consuming the liquid residue. The present invention, however, contemplates the provision of a novel burner.

A further improvement of the present invention consist in a novel arrangement and construction of the evaporating tanks with the object of increasing the velocity of the petroleum which circulates in those tanks around the condensing coils for increasing the transmission of heat through the walls of the condensing coils.

Still another improvement has to do with the treatment of the residual vapors from a condensing operation and provides that such vapors be sent to the same tank through which they have just passed in vapor form, in order to favor their rectification before they are set to the condensing coil of the next lower temperature stage.

Still another improvement has to do with the treatment of all the vapors which come from a given evaporating tank, and provides for their rectification before they are subjected to any condensing action.

Still another feature of improvement has to do with a novel construction and arrangement of the distillation boiler unit, designed to prevent the cracking of the petroleum in the heater tube or tubes of the boiler and also the depositing of carbon in the boiler tubes. In accordance with this feature, provision is made for recirculating the liquid through the boiler unit at high velocity while removing from the circulating liquid at a point outside the boiler any solid matter, such as particles of carbon, which may be formed.

It is an important point in connection with the novel boiler unit that the unit includes in its recirculatory system a flash chamber for maintaining, outside of the directly heated region, a considerable reservoir of the heated liquid, and that the fresh liquid to be distilled is added to this reservoir of heated liquid on its way to the heating coil of the boiler. The volume of liquid transmitted through the recirculatory system in a given length of time is many times as great as the volume of fresh liquid delivered into the flash chamber in the same length of time. It follows that the rise of temperature of the added liquid is many times as great as the loss of temperature which the reservoir liquid suffers by reason of the addition.

As a consequence, nearly all of the vaporizable constituents of the added liquid are given off in the flash chamber before the added liquid reaches the heating coil of the boiler, and are returned for condensation without ever reaching the heating coil.

It should be noted that both the method and the apparatus have utility in connection with the distillation of liquids other than petroleum, including particularly organic liquids having a mixture of fractions, such as mixed alcohols, liquids containing alcohol, and oils of vegetable origin.

Other objects and advantages will hereinafter appear.

In the drawings forming part of this specification and illustrating certain advantageous apparatus for embodying and carrying out the invention:

Fig. 5 is a fragmentary view in sectional, sde elevation of a novel burner especially capable of utilizing the liquid residue of the distillation operations of my process;

Fig. 6 is a fragmentary, diagrammatic view in sectional, side elevation illustrating an evaporating coil having a condensing coil of the same pitch enclosed therein;

Fig. 7 is a view similar to Fig. 6 showing a rectifier associated with the evaporating and condensing coils;

Fig. 8 is a view similar to Fig. 7 showing an arrangement in which recirculation of the petroleum is effected;

Fig. 9 is a fragmentary, diagrammatic view in sectional, side elevation showing an arrangement in which the petroleum which is being heated runs through the evaporating tank before running through the associated heater of the same pressure group;

Fig. 11 is a sectional view through a typical one of the heaters, the section being taken on line 11—11 of Figure 12, looking in the direction of the arrows; and Figure 12 is a sectional view of the heater shown in Figure 11, the section being taken on the line 12—12 of Figure 11, looking in the direction of the arrows.

Figure 1:
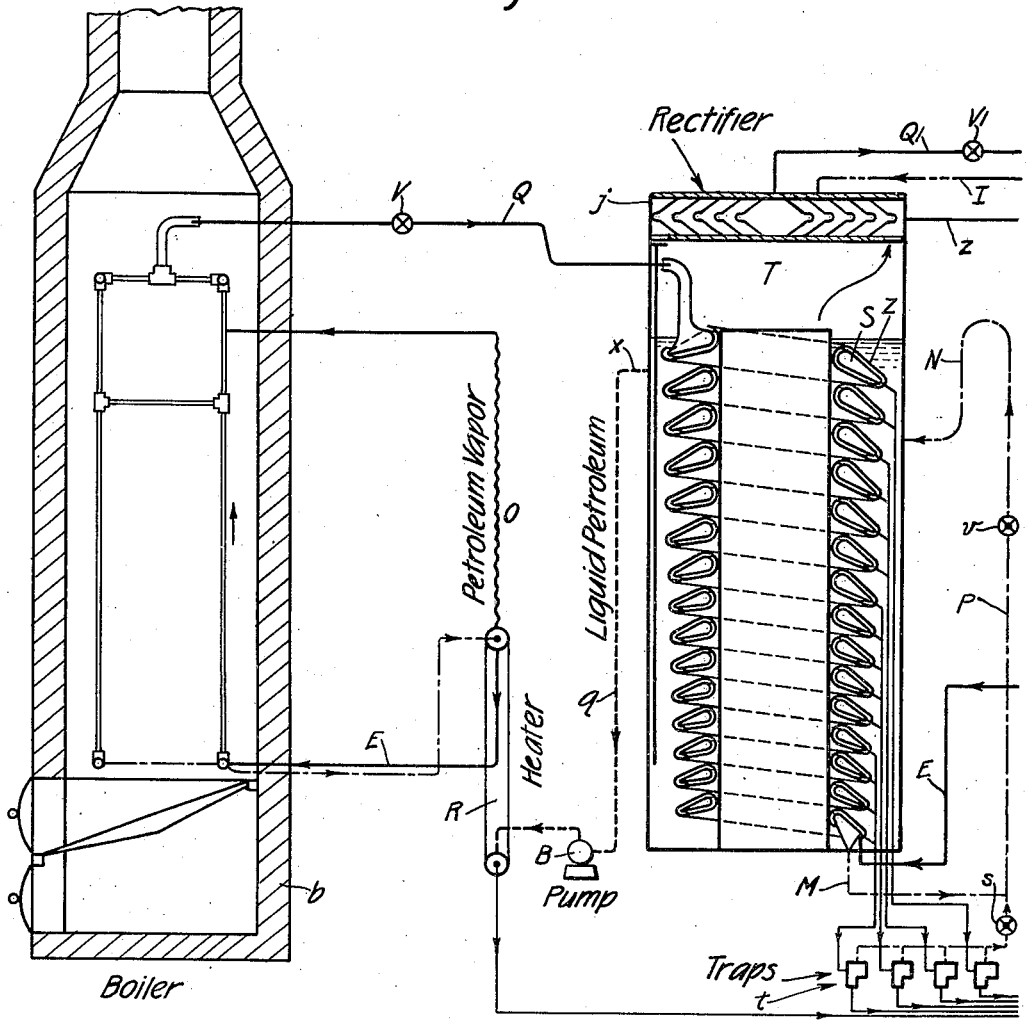
Figs. 1, 2, 3 and 4 are diagrammatic views in sectional, side elevation which, when placed end to end, show in its entirety that portion of a distilling plant immediately connected with the invention.

The disclosure of Figs. 1 to 4 will first be described because those figures show comprehensively a system embodying certain features of the invention, to which system the other features of the invention are applicable.

The petroleum to be distilled is delivered through a pipe E3 (Fig. 4) to the lower end of a helical coil Z3 located in the first evaporating tank T3. The coil Z3 encloses a condensing coil S3 which receives vapors at its upper end from a pipe Q3, and discharges them at its lower end (if uncondensed) to a pipe M3. The petroleum entering the coil Z3 at the lower end thereof travels upward through the length of the coil and at the upper end of the coil is discharged in the tank T3, so that the petroleum in the tank surrounds the coil Z3. This arrangement tends to equalize the pressure at the inner and outer sides of the coil Z3 so that a thin walled coil may be employed. The arrangement also tends to stabilize the resultant temperature condition of the petroleum which leaves the tank T3. The vapors developed in the coil S3 and the tank T3 pass out from the top of the tank through a pipe Q4, pass a valve V4, and are delivered to a helical condensing coil S4 which is water cooled. The condensate is extracted at intervals from the coil S4 through drains $e$-$e6$ inclusive, the extracted fractions being kept separate as illustrated. The liquid is delivered from the tank T3 through pipes $x3$ and $q3$ to a pump B3. The pump B3 delivers the liquid through a heater R3 and thence to a pipe E2. The pipe E2 delivers the liquid to the lower end of a coil Z2 located in the second evaporating tank T2. In this tank the action is generally the same as that occurring in the tank T3. The vapors are driven off from the liquid in coil Z2, and the remaining liquid is permitted to overflow into tank T2. The vapors generated in the coil Z2 and in the tank T2 are passed through a spiral rectifier $j2$ (Fig. 3) of the kind disclosed in Fig. 23 of my pending application Serial No. 153,371, filed July 13, 1937, for Centrifugal distillation.

In the rectifier, entrained liquid particles are separated from the vapors by the centrifugal force developed and are caused to drain down onto the floor of the rectifier and thence back into the tank T2. The remaining vapors, however, go out through a pipe Q3 controlled by valve V3 and are delivered back to the condensing coil S3. Some of the liquid which passes through the pump B3 and is caused to pass to the rectifier $j2$ through pipe I7, to be used as rectifying liquid in rectifier R2. Vapors from the heater R3 are delivered through a pipe $z2$ to the rectifier $j2$ at the introductory end thereof.

The vapors to be condensed in the coil S2 are delivered to the upper end of the coil by pipe Q2. The condensate is led off to traps $t2$ from which the vapors are returned through pipes $f2$ and P2, and pipe N2 to be injected into the liquid in the tank T2. The uncondensed vapors issuing from the lower end of the coil S2 are delivered through a pipe M2 to the pipe P2.

The pipes $f2$ and P2 are desirably provided with suitable valves $s2$ and $v2$ which can be manually regulated.

The intimate contact of the vapors which pass through the coil S2 with the liquid of the tank T2, heated by them, and the subsequent intimate contact of those same vapors with the vapors produced in that tank, will produce the condensation of the vapor fractions of the mixed vapors of lesser volatility than the liquid which passes in liquid form through that tank.

This construction has for its object to perfect the classification effected by this process of distillation.

It is to be noted that the pipe N2 is formed with an inverted U bend, being carried above the level of the liquid in the tank T2, and thence downward for communication with the tank below the surface of the liquid. This avoids the possibility of liquid being driven backward through the pipe N2.

The liquid from the tank T2 is delivered through pipes $x2$ and $q2$ to a pump B2 of the next evaporating stage or unit. The units of which the tanks T1 and T (Figs. 2 and 1) form parts, are substantially like the unit of which the tank T2 forms a part and need not be described in detail.

The liquid remaining in the tank T (Fig. 1) passes out through pipes $x$ and $q$ to the pump B. The pump B delivers the liquid through a heater R to a boiler $b$ which is illustrated as of the same type disclosed in my pending application Serial No. 126,401. The vapors generated in the boiler are delivered back to the coil S through V and Q. The liquid residue from the boiler is passed back through the heater R, thence through the heater R1 (Fig. 2) and so on. The liquid condensate from the tank T is passed through the heater R1 then through the heater R2 and so on. Similarly the condensate from the coil S1 is passed through the heaters R2 and R3, while the condensate from the coil S2 is passed through the heater R3. The residue and the various condensates are all kept separate.

The system thus far described is generally similar to that disclosed in my application Serial No. 126,401, but salient points of difference reside in the provision of helical evaporating coils, the delivery of liquid from an evaporating coil to a surrounding tank, the provision and arrangement of rectifiers in association with the tanks, and certain feed back arrangements for the vapors which have been described.

Figure 10:
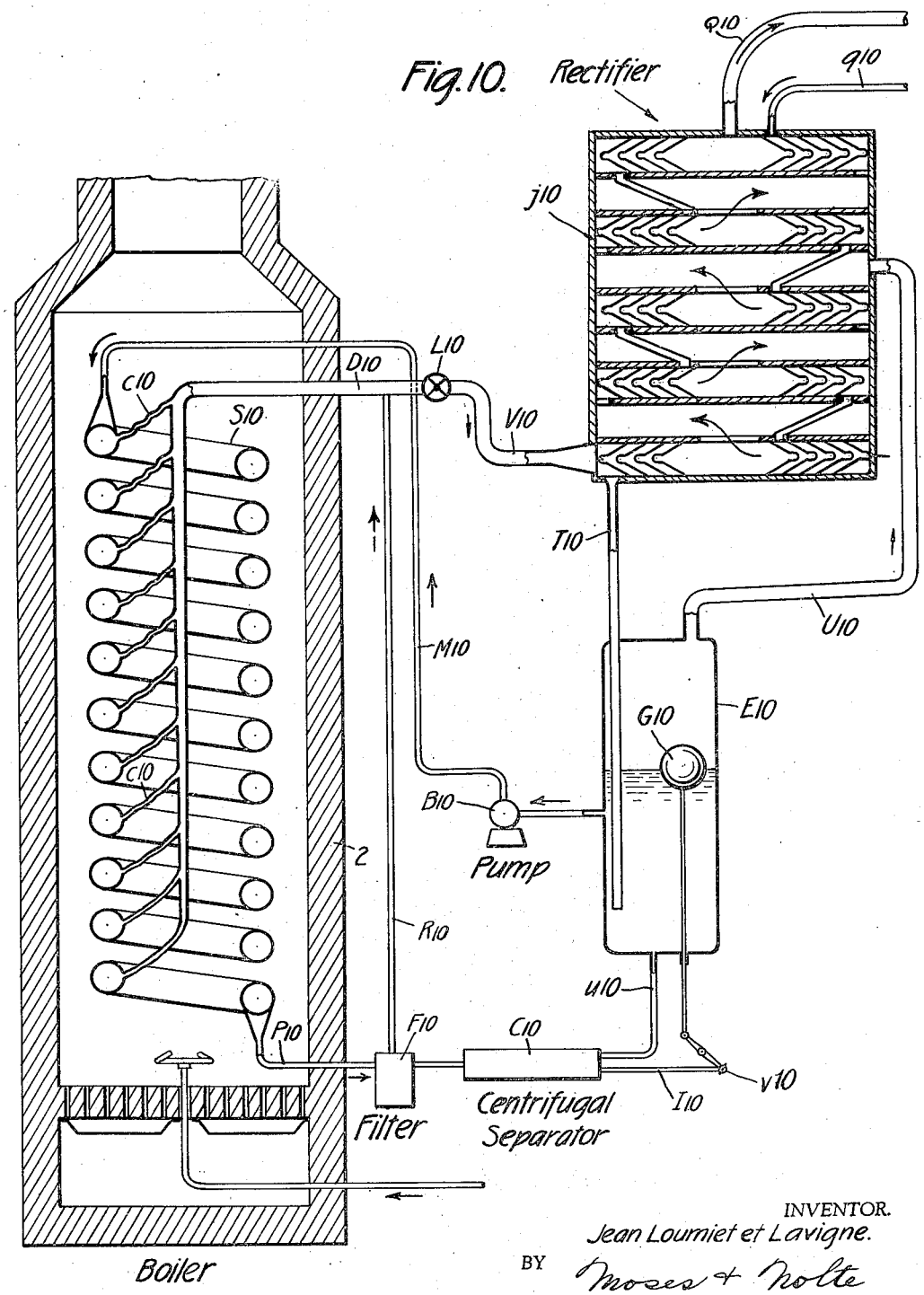
Fig. 10 is a fragmentary, diagrammatic view in sectional, side elevation illustrating a novel form of boiler apparatus.

While the apparatus of Figs. 1 to 4 has been described as one unitary structure, the burner and the boiler apparatus of Figs. 5 and 10 may be, and desirably is substituted as a unit for the boiler of Fig. 1. One or more of the burner and boiler units of Figs. 5 and 10 may be utilized, but when this is done the units are connected in parallel with relation to the remainder of the system, so that the petroleum to be distilled is delivered to the boiler units from the pipe $q$ and vapors are returned from the pipe Q of Fig. 1.

It is an object of the invention to utilize the liquid residue of the distillation process as fuel for heating the boiler, and this may be efficiently accomplished by means of the burner illustrated in Figs. 5 and 10.

The problem in producing a satisfactory petroleum burner consists in sub-dividing the fuel as far as possible so as to increase its surface contact with the air, and thereby to avoid—for its combustion—the employment of a great excess of air. The employment of an excess of air represents the heating of a useless mass of air, the heat of which is partially unrecoverable, and a decrease of the transmission of heat to the liquid intended to be heated, both because of the lower temperature of the combustion gases, and also because of the reduced proportion of steam in those gases.

The burner of the present invention resembles a hydraulic lawn sprinkler of the rotary type. The sprinkler or jet portion of the burner M5 comprises two or more arms fixed on a tube S5. The tube S5 revolves vertically upon a ball box B5, and is held vertical by ball boxes B11 and B12. A tube N5 surrounds the sprinkler tube S5 and is sealed with relation to it by means of a stuffing box P5. The tube N5 is connected by means of flanges with a pipe T5 which delivers the fuel to the burner.

The sprinkler head enters the bottom of the furnace through an orifice O5 of slightly larger diameter than the sprinkler tube S5.

The bottom of the furnace is formed with a multiplicity of passages $p5$ for the admission of combustion air. The admission of the combustion air is controlled by butterfly valves V5 associated with a double bottom D5.

The sprinkler is constructed so that the outflowing liquid is projected upward and toward the periphery in an oblique direction to the vertical and also to the horizontal plane. The section of the tube which throws the petroleum toward its extremity, is built narrow in a horizontal direction at the outlet and is elongated upward. The flow area of the tube is desirably subdivided into several short sections located one above the other. The spray head is rotated by the liquid fuel flowing through it.

It is, of course, evident that the burner described may be used with, or independently of, a process of distillation; also that such a burner may be used in connection with a process of distillation for consuming any excess of liquid residue as fuel to supply heat for other industrial purposes.

When the boiler of Fig. 10 is substituted for the boiler of Fig. 1, the liquid from the tank T of Fig. 1 is delivered through a pipe $q10$ to the top of a rectifier J10. The liquid passes downward through the rectifier to a pipe T10 whereby it is delivered to a float chamber or tank E10 in which a constant quantity of liquid is maintained through a valve controlling float G10, as will be described.

The liquid is pumped from the tank E10 by pump B10, and is transmitted at high velocity and in large quantity through a pipe M10 to the upper end of an evaporating coil S10. The vapors produced in the coil S10 are extracted from all the turns of the coil S10 by drains $c10$, which start from the inner side of the coil and convey the vapors to a vertical tube D10. The tube D10 is of variable section, increasing in area from the bottom upward to admit the successive extractions of vapors.

The unevaporated petroleum passes through a pipe P10 to a filter F10 where it is deprived of any carbon particles that may be entrained, and where any entrained vapors are also separated and delivered through a pipe R10 to the upper portion of the pipe D10. The liquid goes from the filter F10 to a centrifugal separator C10. From the separator C10, the denser part—namely, the part situated at the outward side of the separator section—is separately collected by a drain $I_{10}$ which is disposed tangential to the motion. This material constitutes the residue of the distillation operation. The drain $I_{10}$ is controlled from the float G10 by a valve $v10$, to regulate the rate at which the residue is discharged from the system. Part of this residue may be delivered to the burner or burners, and the balance sent back to the heaters for recuperation of heat in the form described.

The ball controlled valve $v10$ automatically maintains the quantity of liquid in the tank E10 uniform, and thereby assures that the quantity of vapors and liquid leaving the boiler unit will be exactly equal to the quantity of fresh liquid delivered to the boiler unit through the pipe $q10$.

The lighter portion of the petroleum delivered by the centrifugal separator C10 goes through a pipe $u10$ back to the tank E10. The vapors which pass through the pipe D10 travel past a valve L10 and thence through a pipe V10 to the lower end of the rectifier J10. The vapors which pass through the rectifier are delivered by the pipe Q10 back to the first condensing coil S. Any vapors collected in the top of the tank E10 are transmitted by a pipe U10 to an intermediate portion of the rectifier J10.

The primary feature of the described boiler consists in causing the liquid which is being heated in the boiler to run at a great velocity and in large volume through the recirculatory system boiler unit. Since the constant transmission of fresh liquid at high velocity would result practically in passing through a much greater volume of liquid than the boiler can distil, the feature of causing the same liquid to be circulated over and over again is of great importance.

The rate of transmission of liquid by the pump B10 through the system M10, S10, P10, F10, C10 and E10, is many times as great as the rate of delivery of fresh liquid through the pipe T10 to the tank E10.

Consequently a rise of temperature of the liquid freshly introduced into the tank E10 occurs which is many times as great as the loss of temperature suffered by the liquid already in the tank E10. The recirculating liquid in the tank E10, therefore, causes the fresh liquid to be raised quickly in the tank E10 to a temperature nearly as as great as the maximum temperature which the recirculating liquid attains in the coil S10. The float chamber or tank E10 constitutes, therefore, a flash chamber in which the vapors are suddenly liberated in large volume.

The slight loss of temperature of the liquid in the tank E10 is made up by the transmission of the liquid through the coil S10.

In a word, the large recirculating mass absorbs heat in the boiler coil S10 and transfers it to the tank E10 where the last fractional distillation takes place. The boiler tube S10 does not raise the temperature of the circulating mass much and, therefore, only a small degree of distillation takes place in the tube S10, the vapors which are susceptible of distillation having already been, for the most part, eliminated from the liquid in the tank E10.

The velocity of the liquid not only offers the advantage of preventing the obstruction of the tubes, but also that of increasing the transmission of heat through the tubes, that is, to diminish their number for a given amount of heat production.

The production of a high velocity of the liquid within the tube S10 introduces a problem with relation to friction, and hence, to differences of pressure at the inlet and outlet of the tube. It would be convenient to utilize long tubes to increase the heating surface with the same circulating volume; but then the difference of pressure existing between various points of the same tube would make the employment of a simple structure difficult. The problem is satisfactorily solved, however, by utilizing a recirculating boiler of the kind illustrated and described, and by employing as many of the tubes S10 in multiple as may be necessary for producing the desired heating of the liquid.

Figure 2:
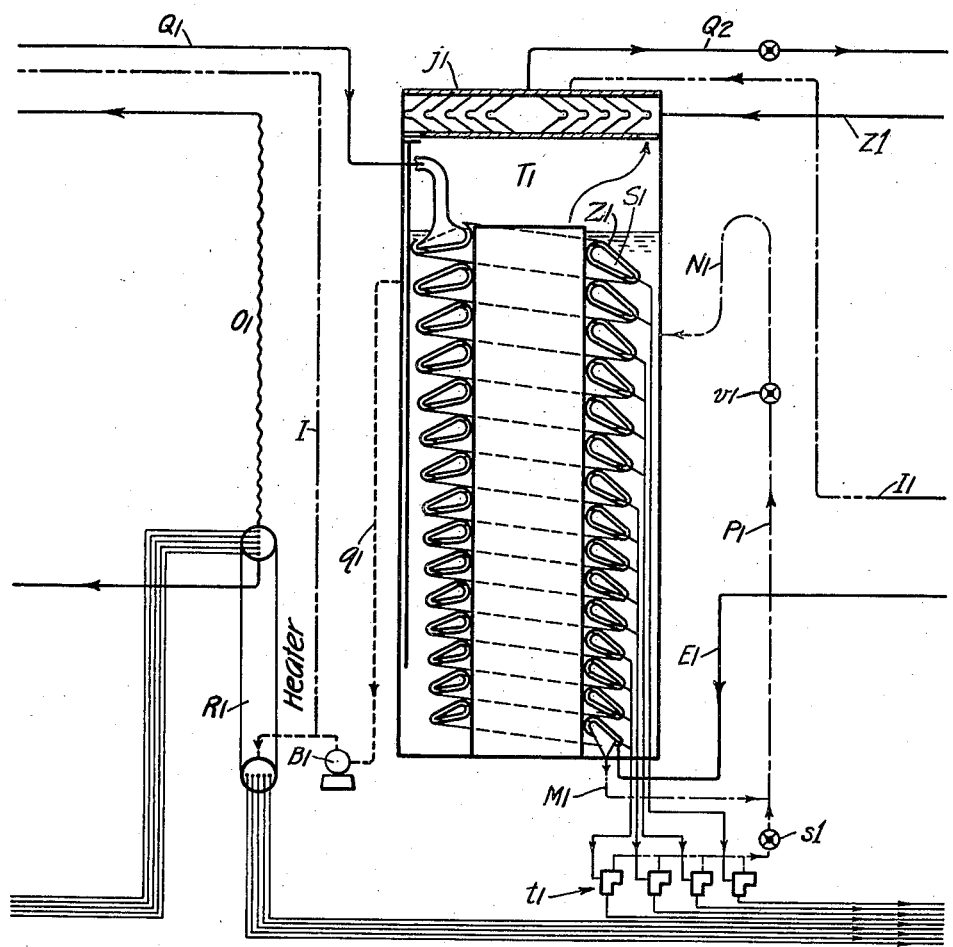
Figure 3:
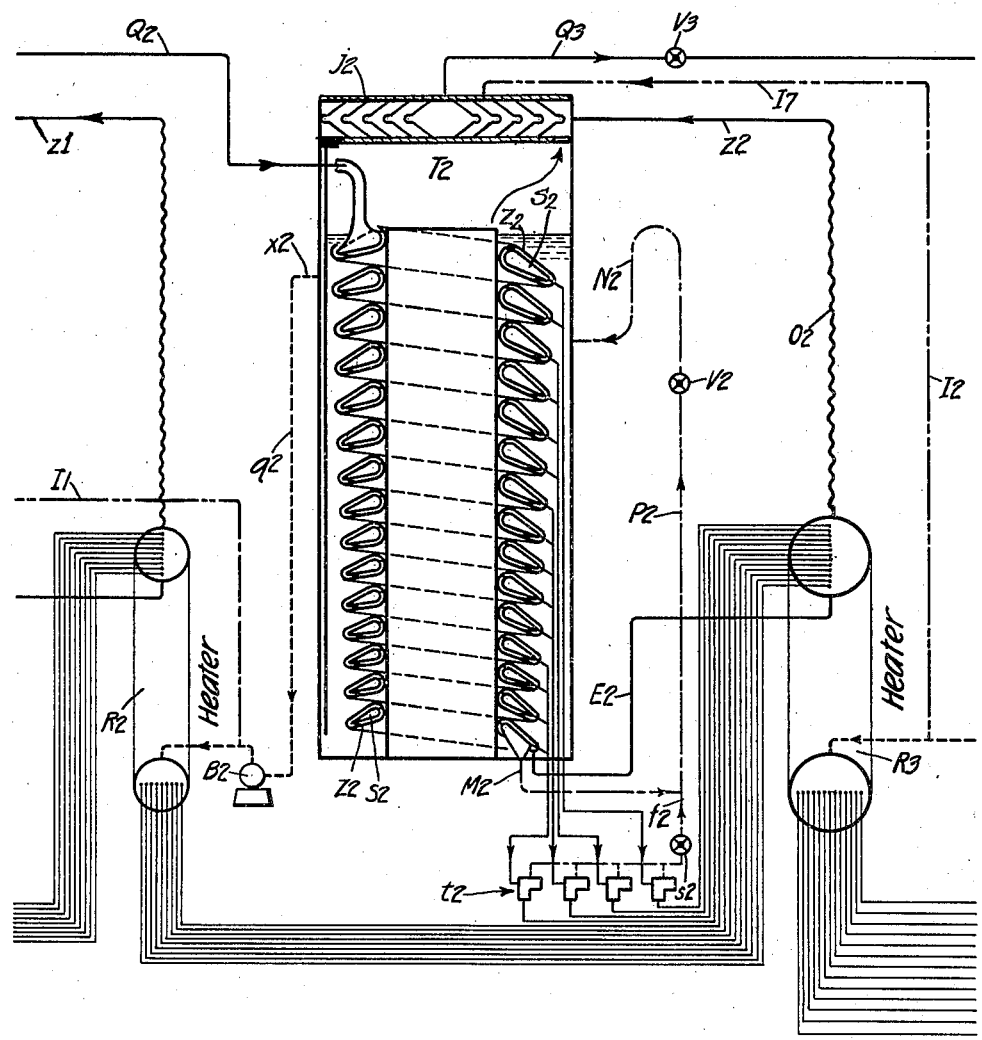
Figure 4:
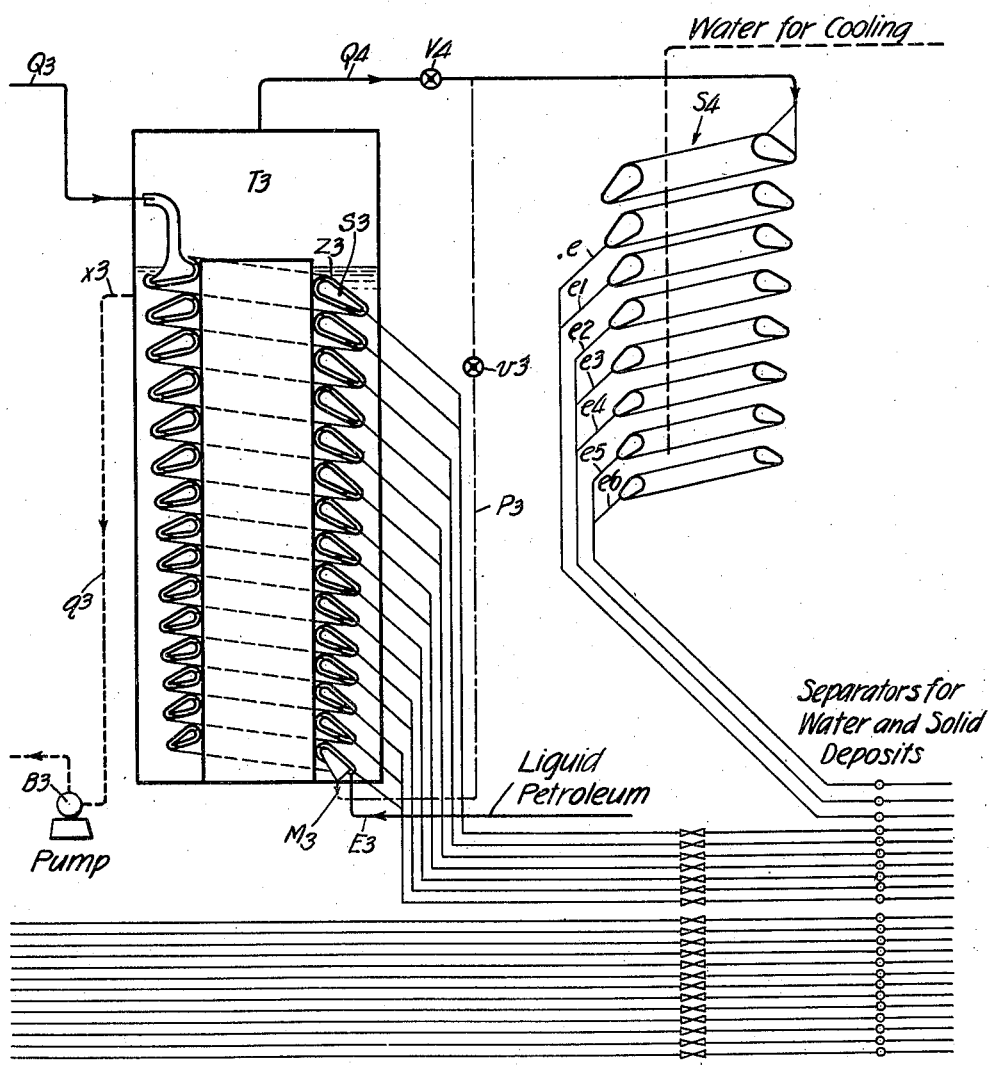

Fig. 8 illustrates an improved evaporator and rectifier unit which can be substituted for one or more of the units T to T2 of Figs. 1 to 3.

In the apparatus as disclosed in Fig. 8, the liquid to be distilled is delivered to the lower end of a helical evaporating coil Z8 which contains a helical condensing coil S8. In this instance, there is no tank surrounding the coil Z8 and the coil Z8 is made strong enough to withstand the pressure of the contained liquid.

Inside the coil Z8 the liquid and the vapor produced circulate at the same time, and when the velocity obtained in that motion becomes substantial—as it does principally in the upper part of the coil—the centrifugal force precipitates the liquid against the outer wall. This liquid is then extracted from the outer portion of the coil Z8, and injected at an inner portion of a lower turn of the coil. This is accomplished through tubes $a8$, indicated in broken lines in Fig. 8. The extraction from an upper turn and the injection into a lower turn of the coil are effected in the direction of the motion in order to facilitate the operation.

The extraction and reinjection are effected upon a small scale, but may nevertheless, be utilized to advantage. A considerable part of the exterior of the condensing coil is washed by the vapor produced, and not by the liquid to be distilled. That vapor absorbs the heat given off by the condensing coil, and transmits it to the liquid through the surface of contact with the liquid; but of course, much less perfectly than is the case if the second transmission is promoted by the injection of the liquid at the internal part of the coil section and the atomization of the liquid by the stream of vapor.

The rapid and more perfect transmission by the petroleum vapor circulating in the coil Z8 of the heat which it receives from the condensing coil S8, has the advantage that it keeps the temperature of the vapor as low as possible, thus increasing the transmission of heat through the condensing coil. The useless employment of heat for raising the temperature of the vapors to an unnecessarily high degree is thus avoided.

The liquid and vapor are delivered together to a small tank D8 at the upper end of the coil Z8. The liquid passes thence through a pipe $x8$ to the next heating and evaporating unit. The vapors are delivered to the upper end of a rectifying coil $j8$, and pass downward through the coil. The vapors delivered from the lower end of the coil are discharged into a pipe T8, which conducts them to the condensing coil of the preceding evaporating unit. Drains $m8$, $n8$, $p8$, $q8$, $r8$ and $s8$ remove precipitated liquid from the outer sides of the turns of the rectifier coil $j8$ and return them through a pipe V8 to the inner side of one of the turns of the coil Z8 at some distance down from the top of the coil. Drains $e8$, $f8$, $g8$ and $h8$ remove the condensate from the inner coil S8 and deal with it in the manner illustrated with respect to the traps $t2$ of Fig. 3.

A small quantity of the liquid en route to the coil Z8 is delivered by pipe $l_8$ to the upper end of the rectifier $j8$, the action being similar to that illustrated with reference to the pipe $l_2$ of Fig. 3.

In Fig. 6, disclosure is made of an evaporating and condensing unit which is in many respects similar to the evaporating and condensing unit of Fig. 8. An evaporating coil Z6 surrounds a condensing coil S6. The liquid to be distilled is delivered by a pipe E6 to the lower end of the coil Z6 and passes thence upward through a small tank D6. From the tank D6 liquid passes through a pipe $x6$ to the unit next higher in the temperature scale.

The petroleum vapors produced along the coil Z6 are extracted from each turn of the coil by drains $c6$ which convey them to a general collecting pipe T6. The pipe T6 discharges the vapors into a tank D6. The vapors united in this way in the tank D6 leave the tank through a pipe V6 and may be dealt with in the manner illustrated in Fig. 8.

The extracting pipes c6 are undulating in form and their diameter is calculated to permit petroleum vapor but not liquid petroleum to be extracted through them.

The pipe Y6 feeds vapors to the condensing coil S6, and the vapors not condensed in that coil are discharged at the lower end.

Fig. 6 illustrates an arrangement in which the condensate is extracted from alternate turns of the condensing coil S6, successive pairs of drains being united in drain pipes e6, f6, g6 and h6.

Fig. 7 illustrates an arrangement closely similar to that of Fig. 6, together with a rectifier as disclosed in Fig. 8. The Fig. 7 disclosure differs from the Fig. 6 disclosure in the fact that the drains c7 withdraw the vapors and deliver them to the vapor collecting pipe T7, only from alternate turns of the coil Z7. The rectifier j7 is associated with the coil Z7 in the same way that the rectifier j8 is associated with the coil Z8. In view of the correspondence of the parts of the Fig. 8 disclosure not already described in detail, to similar parts of Figs. 6 and 8, further detailed description of the apparatus of Fig. 7 is deemed unnecessary. Corresponding reference numerals have been applied to corresponding parts with the subscript "7" added in each instance.

In Fig. 9 disclosure is made of a modified form of heating and evaporating unit. In all of the forms heretofore discussed, the liquid to be distilled passes from a pump through a heater unit, and thence through an evaporating tank or coil en route to the pump of the next higher pressure stage. Regarding that portion of the system included between successive pumps as a pressure stage unit, the apparatus of Fig. 9 is featured by the fact that the liquid is pumped by pump B9 directly to an evaporator coil Z9. The liquid and vapors pass together from the coil Z9 into the tank T9. The vapors pass through a rectifier j9 and thence to a pipe Q9 for disposition in a manner which will be well understood from the preceding description of Figs. 1 to 4.

The liquid is delivered from the tank T9 through a pipe F9 to the lower end of a heater coil C9. A pipe N9 has branches which communicate with each turn of the heater coil C9 for conducting vapors from the heater coil to the upper portion of the tank T9. The liquid which goes through the heater coil C9 is delivered through a pipe P9 to the next pump B19 of the series.

The condensate from the coil S9 is extracted at numerous points along the coil, and is delivered to traps t9, the liquid portion being discharged through pipes L9 and the vapor portion being conducted through a pipe G9 for delivery into a vapor pipe M9. The vapor pipe M9 conducts the vapors from the lower end of the coil S9 and bubbles them into the liquid in the tank T9.

The petroleum vapors produced in the heater C9 can be sent to the evaporating tank T9 without any danger of the liquid petroleum circulating in the heater returning to the evaporating tank through the tube which conveys the vapors.

The vapors, in such a case, are heavier than those produced in the evaporating tank T9, and on their arrival in the evaporating tank they become rectified, being deprived of the less volatile components which become condensed. The rectification is completed in a small rectifier j9 as already pointed out.

Figures 11 and 12 illustrate typical details employed in the heaters R–R3, although the construction shown in Figures 11 and 12 does not correspond with any single one of these heaters as to the number of tubes or conduits provided for the heating liquids.

The heater 20 as illustrated in Figures 11 and 12 comprises end plates 21 and 22 which are secured by bolts 23 to flanged top and bottom plates 24 and 25. The side walls of the heater are built up of lower single flanged plates 26, upper single flanged plates 27, and intermediate double flanged plates 28, the flanges of adjacent plates being secured to one another in each instance by bolts 29. Reinforcing bars 30 span the flanges of the plates 26, 27 and 28 and are secured to the top and bottom plates 24 and 25 by means of bolts.

The heater is divided into horizontal sections by means of baffle plates 31, 32 for compelling the liquid to be heated (which travels upward) to traverse a tortuous path. The plates 31 start from the end plate 22 and extend across into proximity to the end plate 21, while the plates 32 start from the plate 21 and extend across into proximity to the plate 22. Provision is made for introducing the liquid to be heated into the heater through an opening 33 formed in the lower end of the plate 22 and for conducting the heated liquid away through an opening 34 formed in the upper end of the plate 22.

A series of conduits or tubes 35, 36, 37, 38, 39 and 40 is provided, each such conduit being arranged to conduct one of the heating liquids downward through the heater in heat exchanging relation with the liquid which is being heated. These conduits or tubes are all alike, so that a description of one of them will suffice for all. As illustrated, a single one of these conduits comprises six horizontal sections 41 each of which extends through the heater from end to end in one of the horizontal sections of the heater. Each two adjacent horizontal sections 41 are connected near their ends and outside the heater through a vertical section 42. Alternate vertical sections 42 are located at the left hand end of the heater, and the other alternate vertical sections 42 are located at the right hand end of the heater so that the heating liquid is caused to travel downward in a tortuous path and to traverse each floor or section of the heater. As illustrated, the heating liquid enters the uppermost horizontal section 41 of its conduit, travels downward through the successive sections 41, and is conducted away after having passed through the lowermost section 41.

The horizontal sections 41 are extended slightly beyond the vertical sections 42 and have their ends closed by removable threaded caps 43. The caps may be readily removed to permit cleaning. In some instances it will be desirable to shorten the path traversed by the heating fluid in heat exchanging relation with the fluid being heated, and in that case one or more of the horizontal sections can be rendered inactive simply by exchanging the inlet or outlet connection with a selected one of the caps.

It is to be understood that there will ordinarily be as many of the conduits such as 35–40 traversing a heater as there are distinct heating liquids to be passed through the heater. In some instances, however, a given heating fluid may be divided between two or more such conduits if desired.

Vapor discharge pipes 44 are shown as communicating with several floors of the heater for conducting separated vapors away to vapor pipes such as I-I2.

I have described what I believe to be the best embodiments of my invention. I do not wish, however, to be confined to the embodiments shown, but what I desire to cover by Letters Patent is set forth in the appended claims.

I claim:

1. The method of effecting the last fractionating of a petroleum distillation which comprises establishing a closed heating and vaporizing circuit which includes a heating coil and a vaporization tank, applying external heat exclusively to the heating coil, maintaining a large and substantially uniform quantity of temperature stabilizing residual petroleum in the system so that the quantity of heat absorbed by the petroleum may be large with only a small rise of temperature, maintaining a rapid forced feed circulation of the residual petroleum through the system, adding the petroleum to be vaporized to the residual petroleum in the vaporization tank at a relatively slow rate compared with the rate of transmission of the residual petroleum through the heating and vaporizing system, so that the temperature of the added petroleum is suddenly raised and the vapors contained in the added petroleum are suddenly released to a large extent by the mixture of the added petroleum with the preponderant mass of the hotter residual petroleum in the vaporization tank, directly withdrawing the vapors thus generated from the system, transmitting the unvaporized portion of the added petroleum as a part of the residual mass through the heating and vaporizing system, withdrawing directly from the heating coil any further vapors that may be driven off in the heating coil, and compensating for the addition of the unvaporized petroleum by discharging from the system at the delivery side of the heating coil petroleum which is substantially exhausted of vaporizable constituents at the temperature and pressure of the system, sufficient in quantity to maintain the total mass of petroleum in the system substantially constant.

2. The method as set forth in claim 1 in which the total mass of petroleum in the heating and vaporizing system is maintained substantially constant by measuring the level of the liquid petroleum in the vaporization tank and maintaining the level of such liquid petroleum substantially uniform.

3. The method as set forth in claim 1 in which the substantially exhausted petroleum selected for discharge from the system is the heaviest portion of the residual petroleum, and in which such selection is effected by centrifugal separation.

JEAN LOUMIET ET LAVIGNE.